(12) United States Patent
Valenzuela-Rivas et al.

(10) Patent No.: US 11,825,048 B2
(45) Date of Patent: Nov. 21, 2023

(54) ROTATABLE MEDIA RAMP FOR AUTOMATIC DOCUMENT FEEDER

(71) Applicant: Hewlett-Packard Development Company, L.P., Spring, TX (US)

(72) Inventors: Rene O. Valenzuela-Rivas, San Diego, CA (US); Ryan M. Smith, San Diego, CA (US); Shannon Lai, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/294,537

(22) PCT Filed: Aug. 2, 2019

(86) PCT No.: PCT/US2019/044850
§ 371 (c)(1),
(2) Date: May 17, 2021

(87) PCT Pub. No.: WO2021/025665
PCT Pub. Date: Feb. 11, 2021

(65) Prior Publication Data
US 2022/0131989 A1    Apr. 28, 2022

(51) Int. Cl.
*H04N 1/04*    (2006.01)
*H04N 1/00*    (2006.01)
*B65H 5/38*    (2006.01)

(52) U.S. Cl.
CPC .......... *H04N 1/00588* (2013.01); *B65H 5/38* (2013.01); *H04N 1/0066* (2013.01); *H04N 1/00615* (2013.01); *B65H 2301/44318* (2013.01); *B65H 2404/6111* (2013.01)

(58) Field of Classification Search
CPC .......... H04N 1/00588; H04N 1/00615; H04N 1/0066; B65H 5/38; B65H 2301/44318; B65H 2404/6111
USPC ....................... 358/498, 496, 1.12
See application file for complete search history.

(56) References Cited

U.S. PATENT DOCUMENTS

| | | | |
|---|---|---|---|
| 4,085,929 | A | 4/1978 | Tuchiya et al. |
| 4,440,387 | A | 4/1984 | Ikoma et al. |
| 4,486,015 | A | 12/1984 | Takahashi |
| 4,887,133 | A | 12/1989 | Ikeda et al. |
| 5,284,335 | A | 2/1994 | Golicz |
| 5,430,536 | A | 7/1995 | Fullerton et al. |
| 5,501,445 | A | 3/1996 | Lowman et al. |

(Continued)

FOREIGN PATENT DOCUMENTS

| | | |
|---|---|---|
| CN | 1522867 A | 8/2004 |
| CN | 101221396 A | 7/2008 |

(Continued)

OTHER PUBLICATIONS

"Original Tray Pre-rise Setting: Adjusting the Original Tray Standby Position on the ADF," Konica Minolta, retrieved at https://manuals.konicaminolta.eu/ineo-plus-2060L-2060-2070/EN/contents/id06-_102708692.html, retrieved on Nov. 19, 2018, 2 pages.

*Primary Examiner* — Cheukfan Lee
(74) *Attorney, Agent, or Firm* — Brooks, Cameron & Huebsch, PLLC (57) ABSTRACT

An automatic document feeder includes a media path to route media through an image read area for the automatic document feeder, and a media ramp supported along the media path after the image read area, with an end of the media ramp to rotate in a direction transverse to the media path.

18 Claims, 6 Drawing Sheets

(56) References Cited

U.S. PATENT DOCUMENTS

| | | |
|---|---|---|
| 5,513,017 A | 4/1996 | Knodt et al. |
| 5,746,528 A | 5/1998 | Mayer et al. |
| 5,760,919 A | 6/1998 | Acquaviva et al. |
| 5,832,356 A | 11/1998 | Kurando et al. |
| 5,897,113 A | 4/1999 | Kondo et al. |
| 5,956,161 A | 9/1999 | Takashimizu et al. |
| 6,073,925 A | 6/2000 | Sato |
| 6,095,517 A | 8/2000 | Dinatale |
| 6,128,455 A | 10/2000 | Horiguchi et al. |
| RE37,157 E | 5/2001 | Ikeda et al. |
| 6,350,072 B1 | 2/2002 | Nunes et al. |
| 6,577,825 B1 | 6/2003 | Gonnella et al. |
| 6,641,132 B2 | 11/2003 | Sekine |
| 7,139,108 B2 | 11/2006 | Andersen et al. |
| 7,222,955 B2 | 5/2007 | Ohashi et al. |
| 7,242,901 B2 | 7/2007 | Oya et al. |
| 7,395,026 B2 | 7/2008 | Seo et al. |
| 7,461,837 B2 | 12/2008 | Saito et al. |
| 7,661,675 B2 | 2/2010 | Lan et al. |
| 7,731,179 B2 | 6/2010 | Izuchi et al. |
| 7,731,184 B2 | 6/2010 | Lo et al. |
| 7,819,395 B2 | 10/2010 | Farmer |
| 7,905,482 B2 | 3/2011 | Matsumoto |
| 7,963,516 B2 | 6/2011 | Bokelman et al. |
| 8,016,283 B2 | 9/2011 | Ueda et al. |
| 8,038,143 B2 | 10/2011 | Watanabe |
| 8,144,377 B2 | 3/2012 | Wang et al. |
| 8,237,999 B2 | 8/2012 | Kusama |
| 8,360,425 B2 | 1/2013 | Chng et al. |
| 8,544,840 B2 | 10/2013 | Ng et al. |
| 8,582,183 B2 | 11/2013 | Westcott et al. |
| 8,585,035 B2 | 11/2013 | Ohama et al. |
| 8,590,882 B2 | 11/2013 | Furuyama et al. |
| 8,730,532 B2 | 5/2014 | Lee |
| 9,116,484 B2 | 8/2015 | Masumoto et al. |
| 9,274,480 B1 | 3/2016 | Wynn |
| 9,670,026 B2 | 6/2017 | Watanabe et al. |
| 9,771,133 B2 | 9/2017 | Palmer |
| 9,771,233 B2 | 9/2017 | Miura et al. |
| 9,781,283 B1 | 10/2017 | Wilsher et al. |
| 2003/0038992 A1 | 2/2003 | Emmenegger et al. |
| 2004/0022452 A1 | 2/2004 | McCoy |
| 2004/0065132 A1 | 4/2004 | Tschesche |
| 2004/0113352 A1 | 6/2004 | Chiang |
| 2005/0162494 A1 | 7/2005 | Inokuchi et al. |
| 2006/0170950 A1 | 8/2006 | Seike et al. |
| 2007/0003339 A1 | 1/2007 | Edwards et al. |
| 2007/0003343 A1 | 1/2007 | Washnock et al. |
| 2007/0013120 A1 | 1/2007 | Lo et al. |
| 2007/0063425 A1 | 3/2007 | Tsujinishi |
| 2007/0227332 A1 | 10/2007 | Causse et al. |
| 2008/0037078 A1 | 2/2008 | Chen |
| 2008/0124120 A1 | 5/2008 | Kang |
| 2009/0010697 A1 | 1/2009 | Nishimura et al. |
| 2009/0045565 A1 | 2/2009 | Edwards et al. |
| 2009/0085277 A1 | 4/2009 | Cook et al. |
| 2009/0213436 A1 | 8/2009 | Takuwa |
| 2009/0278302 A1 | 11/2009 | Bokelman et al. |
| 2010/0118327 A1 | 5/2010 | Caspar et al. |
| 2010/0294766 A1 | 11/2010 | Wang et al. |
| 2010/0309528 A1 | 12/2010 | Nacman et al. |
| 2011/0142516 A1 | 6/2011 | Uchida |
| 2011/0188085 A1 | 8/2011 | Oosaki et al. |
| 2012/0019874 A1 | 1/2012 | Schaertel et al. |
| 2012/0044513 A1 | 2/2012 | Park et al. |
| 2012/0178563 A1 | 7/2012 | Lee et al. |
| 2012/0188617 A1 | 7/2012 | Klausbruckner |
| 2012/0242769 A1 | 9/2012 | Murray et al. |
| 2012/0274994 A1 | 11/2012 | Westcott et al. |
| 2012/0274995 A1 | 11/2012 | Westcott et al. |
| 2012/0327458 A1 | 12/2012 | Baba et al. |
| 2013/0088762 A1 | 4/2013 | Yamazaki et al. |
| 2014/0168717 A1 | 6/2014 | Schaertel et al. |
| 2015/0104202 A1 | 4/2015 | Caneza et al. |
| 2015/0304513 A1 | 10/2015 | Tu et al. |
| 2016/0185558 A1 | 6/2016 | Kamichi |
| 2017/0107072 A1 | 4/2017 | Nakamura |
| 2017/0320701 A1 | 11/2017 | Hale et al. |
| 2017/0343083 A1 | 11/2017 | Wright et al. |
| 2018/0007221 A1 | 1/2018 | Mokuo et al. |
| 2018/0029387 A1 | 2/2018 | Fujino |
| 2018/0178563 A1 | 6/2018 | Tamai |
| 2020/0239247 A1 | 7/2020 | Huang et al. |

FOREIGN PATENT DOCUMENTS

| | | |
|---|---|---|
| CN | 102588097 A | 7/2012 |
| CN | 202784939 U | 3/2013 |
| CN | 107435714 A | 12/2017 |
| EP | 1591262 A2 | 11/2005 |
| EP | 1971121 A2 | 9/2008 |
| GB | 0836378 A | 6/1960 |
| JP | 06-148982 A | 5/1994 |
| JP | 09-258498 A | 10/1997 |
| JP | 2015-141386 A | 8/2015 |
| JP | 2016-175739 A | 10/2016 |
| JP | 2018-005197 A | 1/2018 |
| TW | M406892 U | 7/2011 |
| WO | 2005/118443 A2 | 12/2005 |
| WO | 2013/008928 A1 | 1/2013 |
| WO | 2017/147251 A1 | 8/2017 |

ROTATABLE MEDIA RAMP FOR AUTOMATIC DOCUMENT FEEDER

BACKGROUND

An automatic document feeder may be used for automatically transporting a sheet of media to an imaging or scanning position for copying, scanning, faxing, displaying on a monitor, or other processing. Thereafter, the automatic document feeder may eject the media and process a next sheet of media.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Figure 1:
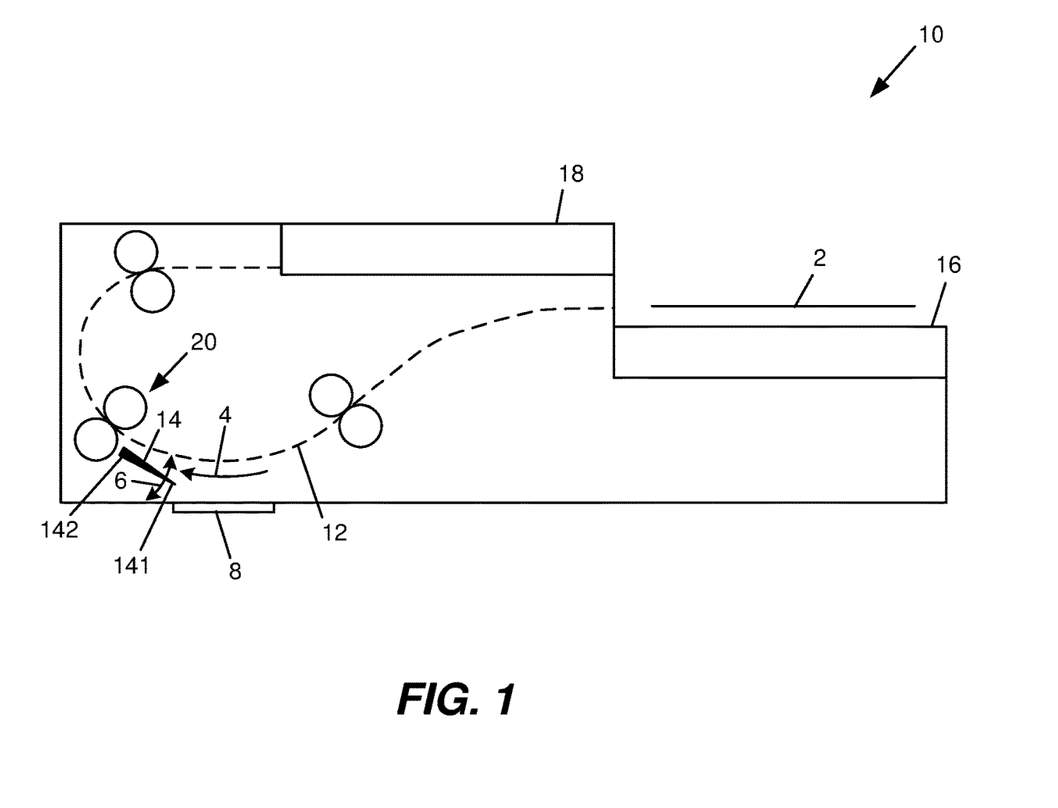
FIG. 1 is a schematic diagram illustrating an example of an automatic document feeder including an example of a rotatable media ramp.

As illustrated in the example of FIG. 1, the present disclosure provides an automatic document feeder (ADF) 10. In one implementation, ADF 10 includes a media path 12 to route media 2 through an image read area 8 for ADF 10, as represented by arrow 4, and a media ramp 14 supported along media path 12 after image read area 8, with an end 141 of media ramp 14 to rotate in a direction transverse to media path 12, as represented by arrow 6.

In examples, end 141 of media ramp 14 extends toward image read area 8. In examples, an opposite end 142 of media ramp 14 is rotatably supported along media path 12. In examples, end 141 of media ramp 14 is biased toward image read area 8.

In examples, ADF 10 includes a roller pair 20 to route media 2 along media path 12. As such, media ramp 14 directs media 2 to a nip of roller pair 20. In implementations, roller pair 20 is a post-scan roller pair.

As disclosed herein, an automatic document feeder, such as ADF 10, may be used to automatically transport media (one sheet or multiple sheets sequentially) along a media path, such as media path 12, from an input tray, such as input tray 16, to a scanning or imaging position, such as image read area 8, and then to an output tray, such as output tray 18. At the scanning or imaging position, the media may be scanned or imaged for copying, scanning, faxing, displaying on a monitor, or other processing. In examples, ADF 10 may be part of a printer, a scanner, a photocopier, a fax machine, or a multi-function or all-in-one device providing printing, scanning, copying, and/or faxing capabilities.

Figure 2:
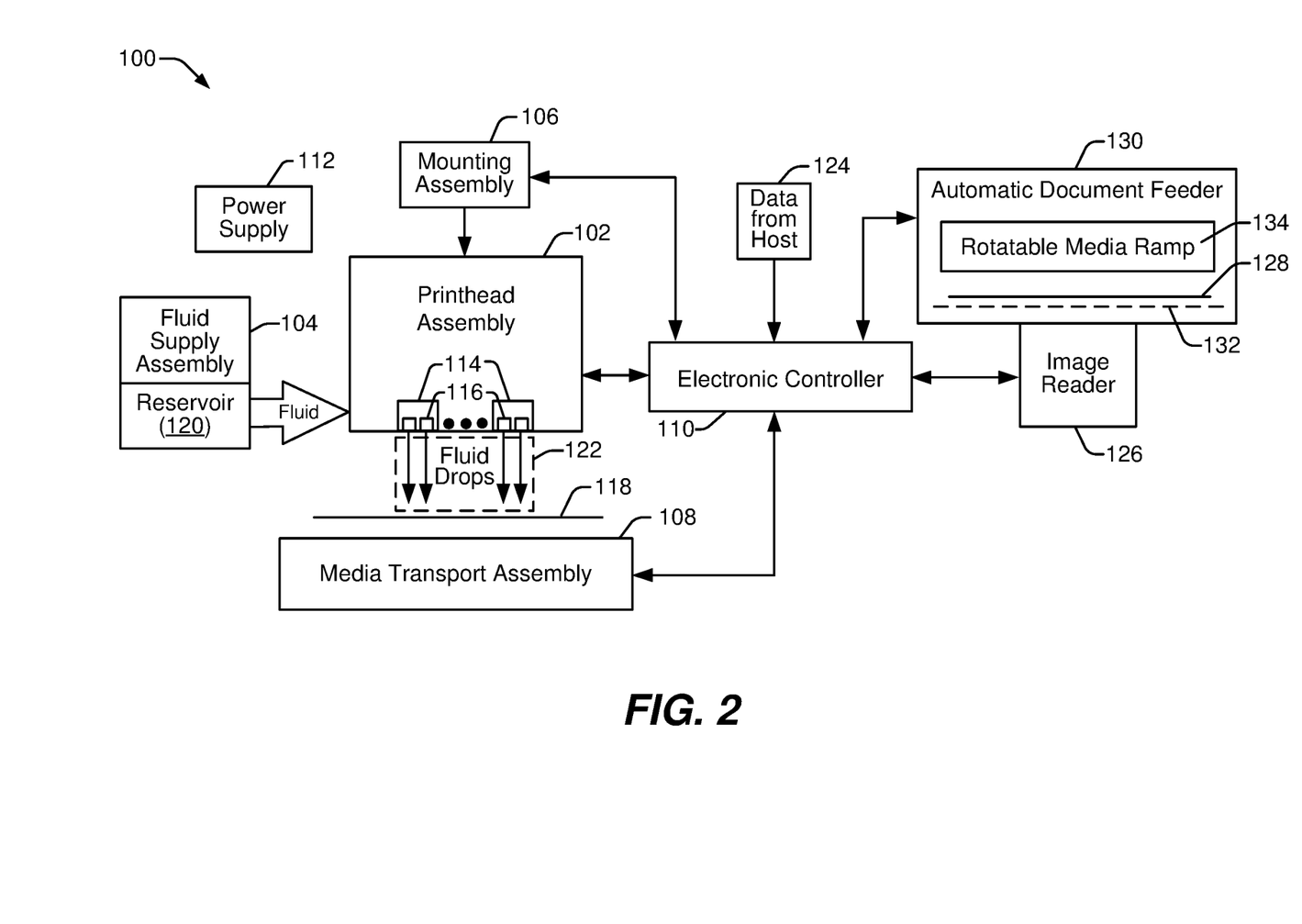
FIG. 2 is a block diagram illustrating an example of an inkjet printing system including an example of an automatic document feeder.

FIG. 2 illustrates an example of an inkjet printing system. Inkjet printing system 100 includes a printhead assembly 102, as an example of a fluid ejection assembly, a fluid (e.g., ink) supply assembly 104, a mounting assembly 106, a media transport assembly 108, an electronic controller 110, and a power supply 112 that provides power to electrical components of inkjet printing system 100. Printhead assembly 102 includes a printhead die 114, as an example of a fluid ejection die or fluid ejection device, that ejects drops of fluid through a plurality of orifices or nozzles 116 toward a print media 118 so as to print on print media 118.

Print media 118 can be any type of suitable sheet or roll material, such as paper, card stock, transparencies, Mylar, and the like, and may include rigid or semi-rigid material, such as cardboard or other panels. Nozzles 116 are arranged in columns or arrays such that properly sequenced ejection of fluid from nozzles 116 causes characters, symbols, and/or other graphics or images to be printed on print media 118 as printhead assembly 102 and print media 118 are moved relative to each other.

Fluid supply assembly 104 supplies fluid to printhead assembly 102 and, in one example, includes a reservoir 120 for storing fluid such that fluid flows from reservoir 120 to printhead assembly 102. In one example, printhead assembly 102 and fluid supply assembly 104 are housed together in an inkjet cartridge or pen. In another example, fluid supply assembly 104 is separate from printhead assembly 102 and supplies fluid to printhead assembly 102 through an interface connection, such as a supply tube.

Mounting assembly 106 positions printhead assembly 102 relative to media transport assembly 108, and media transport assembly 108 positions print media 118 relative to printhead assembly 102. Thus, a print zone 122 is defined adjacent to nozzles 116 in an area between printhead assembly 102 and print media 118. In one example, printhead assembly 102 is a scanning type printhead assembly. As such, mounting assembly 106 includes a carriage for moving printhead assembly 102 relative to media transport assembly 108 to scan print media 118. In another example, printhead assembly 102 is a non-scanning type printhead assembly. As such, mounting assembly 106 fixes printhead assembly 102 at a prescribed position relative to media transport assembly 108. Thus, media transport assembly 108 positions print media 118 relative to printhead assembly 102.

Electronic controller 110 includes a processor, firmware, software, memory components including volatile and non-volatile memory components, and other printer electronics for communicating with and controlling printhead assembly 102, mounting assembly 106, and media transport assembly 108. Electronic controller 110 receives data 124 from a host system, such as a computer, and temporarily stores data 124 in a memory. Data 124 is sent to inkjet printing system 100 along an electronic, infrared, optical, or other information transfer path. Data 124 represents, for example, a document and/or file to be printed. As such, data 124 forms a print job for inkjet printing system 100 and includes print job commands and/or command parameters.

In one example, electronic controller 110 controls printhead assembly 102 for ejection of fluid drops from nozzles 116. Thus, electronic controller 110 defines a pattern of ejected fluid drops which form characters, symbols, and/or other graphics or images on print media 118. The pattern of ejected fluid drops is determined by the print job commands and/or command parameters.

Printhead assembly 102 includes one (i.e., a single) printhead die 114 or more than one (i.e., multiple) printhead die 114. In one example, printhead assembly 102 is a wide-array or multi-head printhead assembly. In one implementation of a wide-array assembly, printhead assembly 102 includes a carrier that carries a plurality of printhead dies 114, provides electrical communication between printhead dies 114 and electronic controller 110, and provides fluidic communication between printhead dies 114 and fluid supply assembly 104.

In one example, inkjet printing system 100 is a drop-on-demand thermal inkjet printing system wherein printhead assembly 102 includes a thermal inkjet (TIJ) printhead that implements a thermal resistor as a drop ejecting element to vaporize fluid in a fluid chamber and create bubbles that force fluid drops out of nozzles 116. In another example, inkjet printing system 100 is a drop-on-demand piezoelectric inkjet printing system wherein printhead assembly 102 includes a piezoelectric inkjet (PIJ) printhead that implements a piezoelectric actuator as a drop ejecting element to generate pressure pulses that force fluid drops out of nozzles 116.

In examples, inkjet printing system 100 includes an automatic document feeder (ADF) 130, as an example of ADF 10, and an image reader 126, such that ADF 130 automatically transports media 128, as an example of media 2, along a media path 132, as an example of media path 12, to and/or past image reader 126. As such, image reader 126 may acquire and/or generate an image of a side or surface of media 128 as media 128 passes a scanning or imaging position or region of image reader 126.

In one implementation, ADF 130 includes a rotatable media ramp 134, as an example of media ramp 14, to direct media to media path 132 after passing the scanning or imaging position or region of image reader 126. More specifically, as disclosed herein, rotatable media ramp 134 directs media to an opposing roller pair in media path 132 after passing the scanning or imaging position or region. In examples, an end of rotatable media ramp 134 is to rotate in a direction transverse to media path 132.

Figure 3:
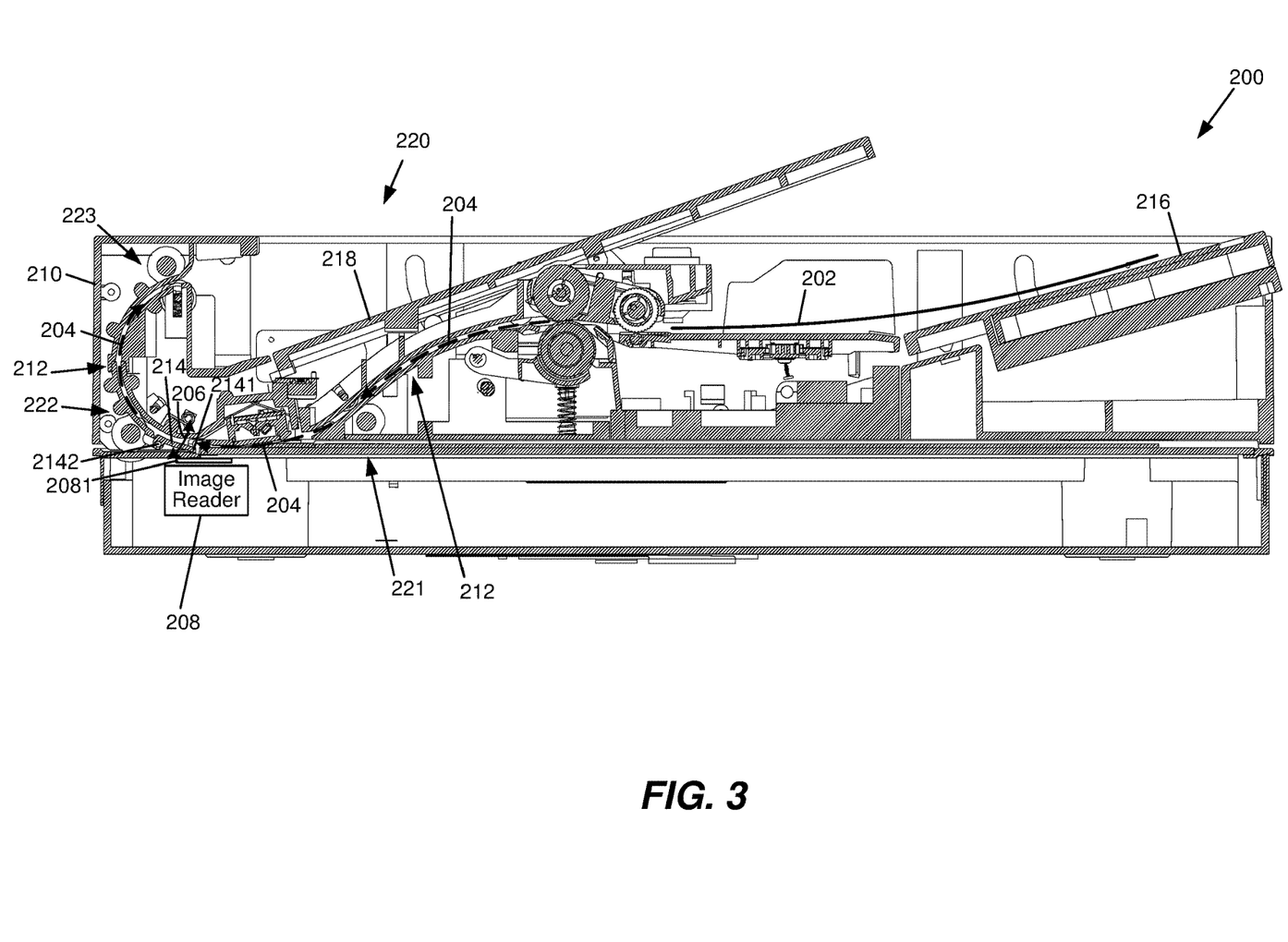
FIG. 3 is a cross-sectional view illustrating an example of an automatic document feeder including an example of a rotatable media ramp.

FIG. 3 is a cross-sectional view illustrating an example of an automatic document feeder (ADF) 200, as an example of ADF 10, 130, including an example of a rotatable media ramp 214, as an example of media ramp 14, rotatable media ramp 134, as disclosed herein.

As illustrated in the example of FIG. 3, ADF 200 includes a housing 210, and a media path 212, as an example of media path 12, 132, within housing 210 to route media through ADF 200, such as media 202, as an example of media 2, 128. In addition, ADF 200 includes an input tray 216, as an example of input tray 16, that supports and supplies media, such as media 202, for input to ADF 200, and an output tray 218, as an example of output tray 18, that receives and supports media as output from ADF 200. Accordingly, as illustrated in the example of FIG. 3, input tray 216 communicates with one end of media path 212 (i.e., an input end), and output tray 218 communicates with an opposite end of media path 212 (i.e., an output end). As such, media, such as media 202, may be routed from input tray 216 to output tray 218 along media path 212, as represented by broken line arrows 204.

In examples, media path 212 includes a variety of guides, rollers, wheels, etc. to achieve handling and routing of media, such as media 202, within and/or through ADF 200, as disclosed herein. In examples, media path 212 routes media, such as media 202, to and/or past an image reader 208, as an example of image reader 126, such that image reader 208 may acquire and/or generate an image of a side or surface of the media as the media passes an image read area 2081 (scan area, scan region, scan position) of image reader 208.

In one example, media path 212 includes a series of opposing rollers or opposing roller pairs 220 to contact and guide and/or route media, such as media 202, along and/or through media path 212. In one implementation, opposing roller pairs 220 include a pre-scan roller pair 221, a post-scan roller pair 222, and an exit roller pair 223. In examples, pre-scan roller pair 221 is positioned upstream or prior to image read area 2081 of image reader 208 to guide media to and/or through image read area 2081, and post-scan roller pair 222 is positioned downstream or after image read area 2081 to guide media through and/or from image read area 2081. Furthermore, exit roller pair 223 is positioned toward, near, or at an end of media path 212 to guide media to output tray 218.

Although described as rollers, rollers of opposing roller pairs 220 may include wheels, including star wheels. Although one pre-scan roller pair 221, one post-scan roller pair 222, and one exit roller pair 223 is illustrated and described, multiple pre-scan roller pairs 221, multiple post-scan roller pairs 222, and/or multiple exit roller pairs 223 may be provided for media path 212.

In implementations, as disclosed herein, rotatable media ramp 214 directs media, such as media 202, to media path 212 after the media has passed image read area 2081 of image reader 208. More specifically, in implementations, media ramp 214 directs media to an opposing roller pair in media path 212 after the media has passed image read area 2081 of image reader 208. For example, in implementations, media ramp 214 directs media to post-scan roller pair 222.

In one implementation, rotatable media ramp 214 is supported along media path 212 after image read area 2081 and before the opposing roller pair, such as post-scan roller pair 222. As such, media ramp 214 is positioned along media path 212 between image read area 2081 and the opposing roller pair, such as post-scan roller pair 222. Accordingly, in implementations, media ramp 214 directs media (after the media has passed image read area 2081 of image reader 208) to a nip of the opposing roller pair, such as post-scan roller pair 222.

In one example, rotatable media ramp 214 has an end 2141 and an opposite end 2142 such that end 2141 of media ramp 214 extends toward image read area 2081. As such, rotatable media ramp 214 provides a ramped surface extending toward image read area 2081 to guide or route media within image read area 2081 to media path 212. In implementations, as illustrated in FIG. 3, in image read area 2081, media path 212 routes media in a media advance direction, as represented by broken line arrow 204. As such, end 2141 of media ramp 214 extends in a direction opposite the media advance direction.

In examples, media ramp 214 may be variably positioned relative to media path 212. More specifically, in implementations, media ramp 214 is rotatably supported along media path 212 at, near or adjacent end 2142. As such, end 2141 of media ramp 214 is a free or unsupported end and may rotate in a direction transverse to media path 212, as represented by arrow 206. More specifically, media ramp 214 may rotate in a direction intersecting a direction in which media is routed through image read area 2081 of image reader 208. As such, rotation of media ramp 214 may vary a height or spacing of media path 212 in an area or region of media path 212 at or after image read area 2081.

In examples, rotatable media ramp 214 is biased toward image read area 2081. More specifically, in examples, end 2141 of media ramp 214 is biased toward image read area 2081. For example, rotatable media ramp 214 may be biased such that end 2141 of media ramp 214 contacts (or maintains contact with) image read area 2081, including, for example, a top surface of (or a surface defining) image read area 2081. In implementations, bias of media ramp 214 may be passive (e.g., gravity, spring, etc.) and/or active (e.g., electrically driven actuator, motor, solenoid, shape memory alloy, etc.).

Figure 4A:
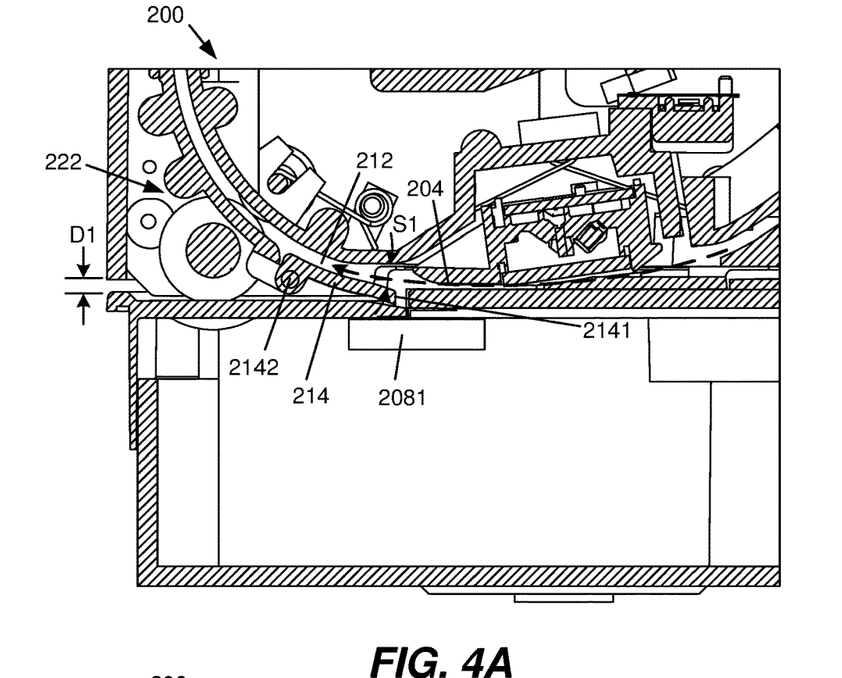
FIG. 4A is an enlarged view of a portion of the automatic document feeder of FIG. 3 including an example of the rotatable media ramp in one rotational position.
Figure 4B:
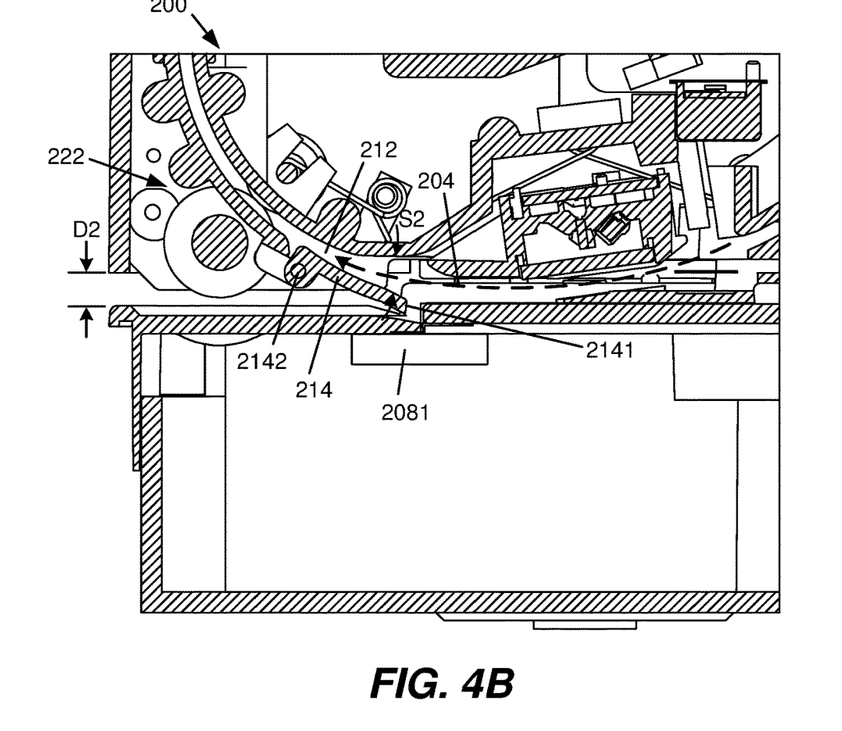
FIG. 4B is an enlarged view of a portion of the automatic document feeder of FIG. 3 including an example of the rotatable media ramp in another rotational position.

FIG. 4A is an enlarged view of a portion of ADF 200, as illustrated in FIG. 3, including an example of rotatable media ramp 214 in one rotational position, and FIG. 4B is an enlarged view of a portion of ADF 200, as illustrated in FIG. 3, including an example of rotatable media ramp 214 in another rotational position.

More specifically, as illustrated in the examples of FIGS. 4A and 4B, a distance between ADF 200 and an underlying surface or component, such as a platen or surface of a flatbed scanner on which ADF 200 is supported, may vary. For example, in FIG. 4A, a distance D1 is identified between ADF 200 and an underlying surface or component, and in FIG. 4B, a distance D2 is identified between ADF 200 and the underlying surface or component. As such, in implementations, media ramp 214 is rotatable (about end 2142) to compensate for the variation in the distance between ADF 200 and the underlying surface or component. Although two example distance are described and illustrated, other distances are within the present disclosure.

In compensating for the variation in the distance between ADF 200 and the underlying surface or component, media ramp 214 may vary a height or spacing of media path 212 in an area or region of media path 212 at or after image read area 2081. For example, as illustrated in FIG. 4A, media ramp 214 (namely, end 2141 of media ramp 214) provides a height or spacing S1 to media path 212 in an area or region of media path 212 at or after image read area 2081 and, as illustrated in FIG. 4B, media ramp 214 (namely, end 2141 of media ramp 214) provides a height or spacing S2 to media path 212 in an area or region of media path 212 at or after image read area 2081. With either spacing, media ramp 214 provides a ramped surface extending toward image read area 2081 to guide or route media to or within media path 212. As such, media may be routed along media path 212, as represented by broken line arrow 204. Accordingly, in examples, media ramp 214 may direct media to a nip of an opposing roller pair, such as post-scan roller pair 222. Although two example spacings are described and illustrated, other spacings are within the present disclosure.

Figure 5:
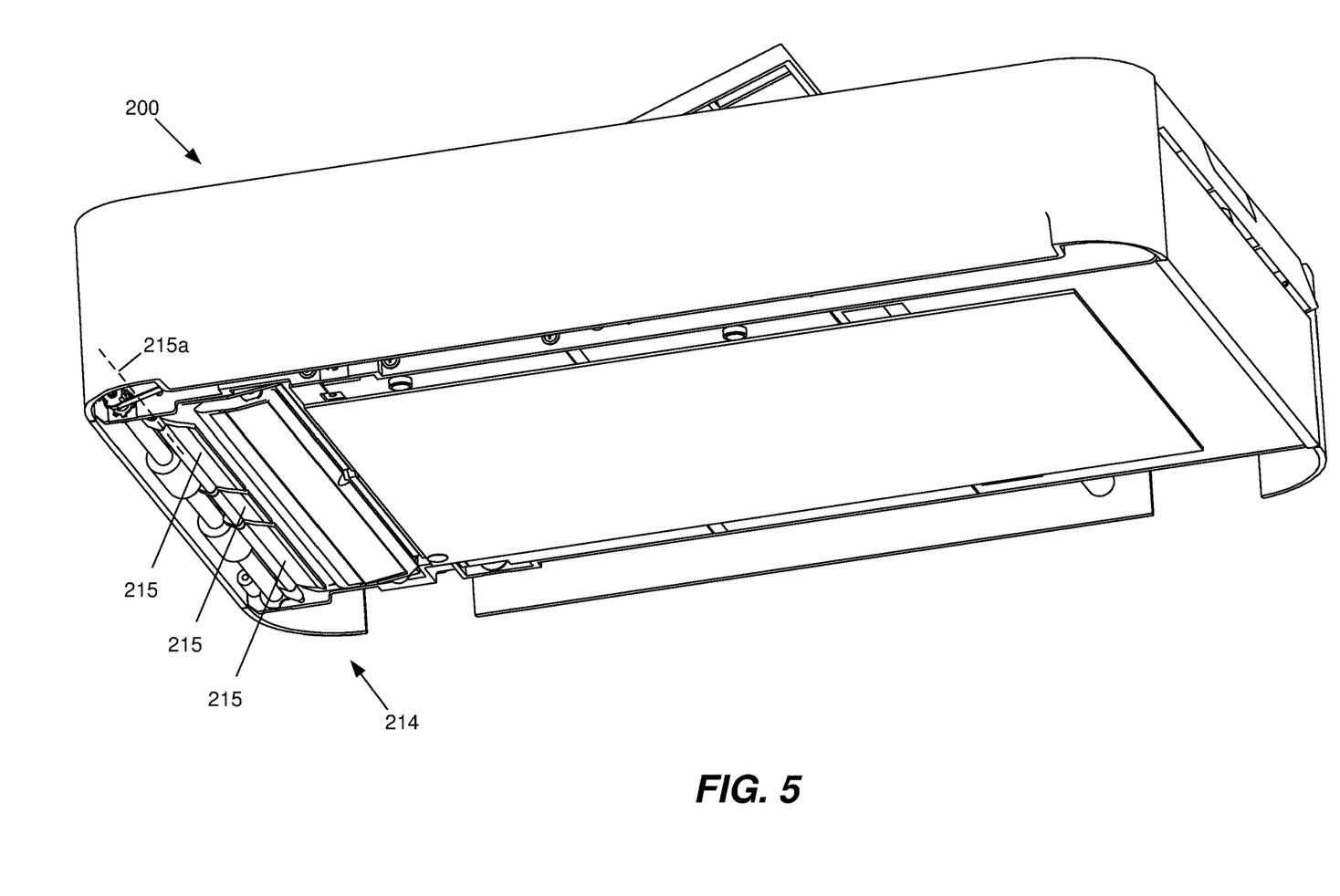
FIG. 5 is a bottom perspective view illustrating an example of an automatic document feeder including an example of a rotatable media ramp.

FIG. 5 is a bottom perspective view illustrating an example of ADF 200. In the example of FIG. 5, rotatable media ramp 214 includes a plurality of individual ramp segments 215. In implementations, each of the ramp segments 215 are rotatably supported along and about a common axis 215a. As such, in examples, each of the ramp segments 215 are independently rotatable about axis 215a. In implementations, ramp segments 215 allow for varying amounts of rotation of media ramp 214 over a width of media path 212 (FIG. 3).

Figure 6:
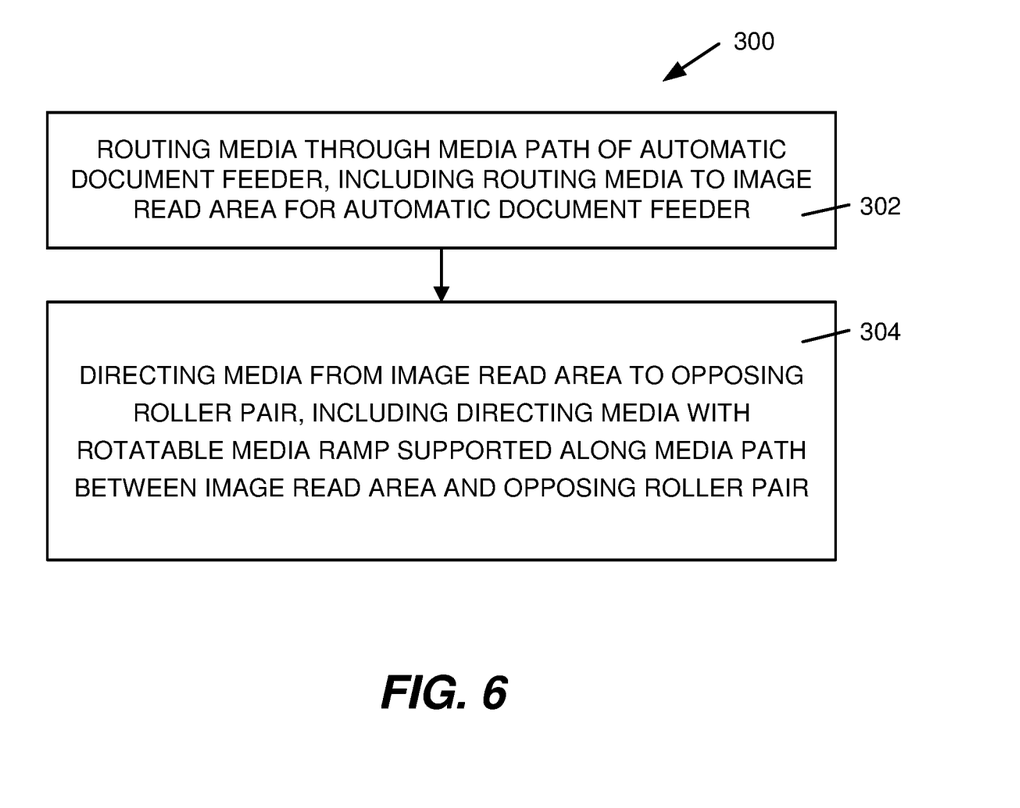
FIG. 6 is a flow diagram illustrating an example of a method of routing media in an automatic document feeder.

FIG. 6 is a flow diagram illustrating an example of a method 300 of routing media through an automatic document feeder, such as routing media through automatic document feeder 10, 130, 200, as illustrated in the examples of FIG. 1, FIG. 2, FIGS. 3, 4A, 4B, 5, respectively.

At 302, method 300 includes routing media through a media path of the automatic document feeder, with the routing of media including routing the media to an image read area for the automatic document feeder, such as routing media 2, 202 through media path 12, 212 of automatic document feeder 10, 200, including routing media 2, 202 to an image read area 8, 2081 for automatic document feeder 10, 200, as illustrated in the examples of FIG. 1, FIGS. 3 and 4A, 4B, respectively.

At 304, method 300 includes directing the media from the image read area to an opposing roller pair, with the directing the media including directing the media with a rotatable media ramp supported along the media path between the image read area and the opposing roller pair, such as directing media 2, 202 from image read area 8, 2081 to an opposing roller pair, such as opposing roller pair 20, 222, including directing media 2, 202 with a rotatable media ramp 14, 214 supported along media path 12, 212 between image read area 8, 2081 and opposing roller pair 20, 222 of automatic document feeder 10, 200, as illustrated in the examples of FIG. 1, FIGS. 3 and 4A, 4B, respectively.

With an automatic document feeder and method of routing media through an automatic document feeder, as disclosed herein, a rotatable media ramp may compensate for misalignment and/or variations in positioning of and/or between the automatic document feeder and an underlying surface or component. As such, the rotatable media ramp helps to guide and/or route media to and/or within a media path, including to a nip of an opposing roller pair of the media path.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

The invention claimed is:

1. An automatic document feeder, comprising:
a media path to route media through an image read area for the automatic document feeder; and
a media ramp supported along the media path after the image read area, an end of the media ramp to rotate in a direction transverse to the media path, the media ramp including a plurality of ramp segments, each of the ramp segments independently rotatably supported along the media path about a common axis.

2. The automatic document feeder of claim 1, wherein the end of the media ramp extends toward the image read area, and an opposite end of the media ramp is rotatably supported along the media path.

3. The automatic document feeder of claim 1, wherein the end of the media ramp is biased toward the image read area.

4. The automatic document feeder of claim 1, further comprising:
a roller pair to route media along the media path, the media ramp to direct media to a nip of the roller pair.

5. The automatic document feeder of claim 4, wherein the roller pair comprises a post-scan roller pair.

6. The automatic document feeder of claim 4, wherein, between the image read area and the roller pair, rotation of the media ramp varies a height of the media path.

7. An automatic document feeder, comprising:
a media path to route media past an image reader;
an opposing roller pair in the media path after the image reader; and a media ramp rotatably supported in the media path between a read area for the image reader and the opposing roller pair, the media ramp to direct media from the read area to the opposing roller pair, the media ramp including a plurality of ramp segments independently rotatably supported about a common axis.

8. The automatic document feeder of claim 7, wherein the media ramp is rotatably supported about a first end thereof, and a second end of the media ramp is to extend toward the read area for the image reader.

9. The automatic document feeder of claim 8, wherein, in the read area for the image reader, the media path is to route media in a first direction, and wherein the second end of the media ramp extends in a direction opposite the first direction.

10. The automatic document feeder of claim 7, wherein rotation of the media ramp varies a height of the media path between the read area for the image reader and the opposing roller pair.

11. The automatic document feeder of claim 10, wherein the media ramp is rotatably supported about a first end thereof, and a second end of the media ramp is to extend toward the read area for the image reader.

12. The automatic document feeder of claim 11, wherein, in the read area for the image reader, the media path is to route media in a first direction, and wherein the second end of the media ramp extends in a direction opposite the first direction.

13. The automatic document feeder of claim 7, wherein, between the read area for the image reader and the opposing roller pair, rotation of the media ramp varies a height of the media path.

14. A method of routing media through an automatic document feeder, comprising:
routing media through a media path of the automatic document feeder, including routing the media to an image read area for the automatic document feeder; and
directing the media from the image read area to an opposing roller pair, including directing the media with a rotatable media ramp supported along the media path between the image read area and the opposing roller pair,
wherein the media ramp includes a plurality of ramp segments independently rotatably supported about a common axis.

15. The method of claim 14, wherein
directing the media includes, between the image read area and the opposing roller pair, varying a spacing of the media path.

16. The method of claim 15, wherein directing the media includes rotatably positioning an end of the rotatable media ramp along the media path.

17. The method of claim 14, wherein directing the media includes rotatably positioning an end of the rotatable media ramp along the media path.

18. The method of claim 14, wherein directing the media includes, between the image read area and the opposing roller pair, varying a spacing of the media path.

* * * * *